(12) United States Patent
Morini

(10) Patent No.: US 6,372,167 B1
(45) Date of Patent: Apr. 16, 2002

(54) PROCESS FOR OBTAINING A SINGLE-PIECE CAPSULE MADE OF A PLASTIC MATERIAL

(75) Inventor: Emilio Morini, Colorno (IT)

(73) Assignee: Bormioli Rocco & Figlio S.p.A., Parma (IT)

(*) Notice: Subject to any disclaimer, the term of this patent is extended or adjusted under 35 U.S.C. 154(b) by 0 days.

(21) Appl. No.: 09/446,187

(22) PCT Filed: Apr. 27, 1998

(86) PCT No.: PCT/IT98/00104

§ 371 Date: Dec. 20, 1999

§ 102(e) Date: Dec. 20, 1999

(87) PCT Pub. No.: WO98/58792

PCT Pub. Date: Dec. 30, 1998

(30) Foreign Application Priority Data

Jun. 20, 1997 (IT) ......................... MO97A0115

(51) Int. Cl.[7] .......................... B29C 43/02; B29C 69/00
(52) U.S. Cl. .................. 264/138; 264/163; 264/296; 264/320
(58) Field of Search ................. 264/138, 163, 264/296, 320

(56) References Cited

U.S. PATENT DOCUMENTS

| 4,458,822 A | 7/1984 | Ostrowsky |
| 4,666,053 A | 5/1987 | Corcoran |
| 5,295,600 A | 3/1994 | Kowal |

FOREIGN PATENT DOCUMENTS

| EP | 0 073 334 A1 | 3/1983 |
| EP | 0 117 104 A2 | 8/1984 |
| EP | 0 410 059 A1 | 1/1991 |
| EP | 0 521 389 A1 | 1/1993 |

*Primary Examiner*—Leo B. Tentoni
(74) *Attorney, Agent, or Firm*—Browdy and Neimark PLLC

(57) ABSTRACT

The invention relates to a process for obtaining single-piece capsules made of a plastic material, which comprises: a press-forming phase for obtaining a single-piece capsule (1) provided with a skirt (2) connected to a lower zone (1a) of the capsule; a folding phase of the skirt (2) internalwise of the capsule, obtained by plastic deformation of the connection zone (3) between the skirt (2) and be capsule; a cutting phase of the lower zone of the capsule, obtained by a radially-directed insertion of blades (4a, 4b) which are shaped such as to obtain cuts (5a, 5b) of predetermined shape and size.

10 Claims, 1 Drawing Sheet

PROCESS FOR OBTAINING A SINGLE-PIECE CAPSULE MADE OF A PLASTIC MATERIAL

TECHNICAL FIELD

The invention relates to a process for obtaining a single-piece capsule made of a plastic material.

BACKGROUND ART

Capsules of the type described above have been in use for some time, as caps for bottle containing water, drinks and liquids in general. These capsules, briefly, comprise a cap for opening and closing the bottle, and a device, generally a security strip, for ascertaining whether a bottle has been opened. The relatively low cost of each of these capsules and the very high number of capsules used lends importance to even a small improvement in their manufacture; indeed, even with a tiny improvement an enormous production saving can be made.

An established manufacturing method for these capsules is press-forming, which consists in introducing a piece of plastic material into the matrix of a die and deforming the material by means of a punch which penetrates the matrix and forces the material to occupy all of the space between the punch and the matrix, which space is obviously in the shape of the finished capsule.

Single—piece plastic capsules are made in this way, which, in the simplest and most economical versions, can be ready for use as soon as they are formed, while more refined and reliable versions require subsequent work operations. This technology has the advantage that the dies are quite simple and can be used, for example, in rotary machines which comprise a large number of die matrices and punches; these machines are extremely fast and can provide a very high rate of production.

The disadvantage of this technology is that, for manufacturing more refined and more reliable capsules, subsequent work operations are required, which lengthen production times at the expense of production rate, i.e. productivity.

The main aim of the present invention is to suggest a process for manufacturing plastic capsules which reduces production times, and therefore costs, but which at the same time produces highly reliable capsules.

This aim is achieved by the process of the invention, as it is characterised in the appended claims.

BRIEF DESCRIPTION OF THE DRAWINGS

Further characteristics and advantages of the present invention will better emerge from the detailed description that follows of the various phases of the process, illustrated purely by way of non-limiting example in the accompanying figures of the drawings, in which.

DISCLOSURE OF INVENTION

Figure 1:
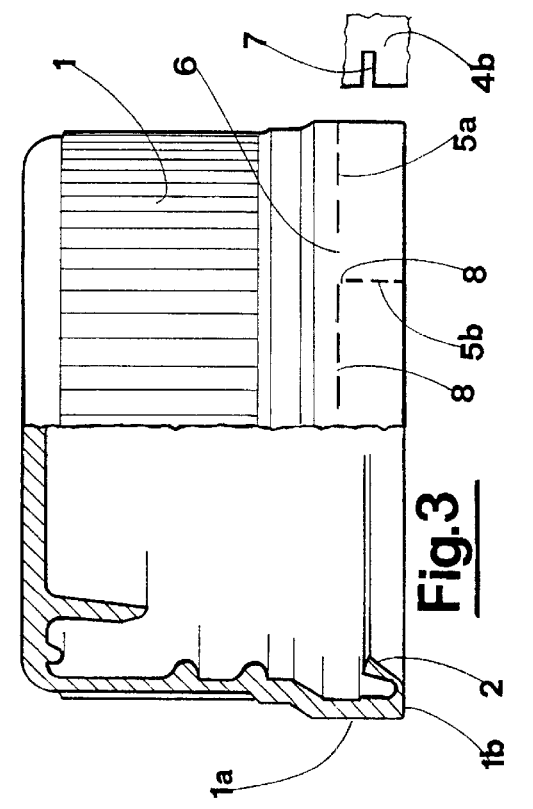
FIG. 1 is a schematic partial vertical-elevation section of a capsule as it appears after the pressing phase.
Figure 4:
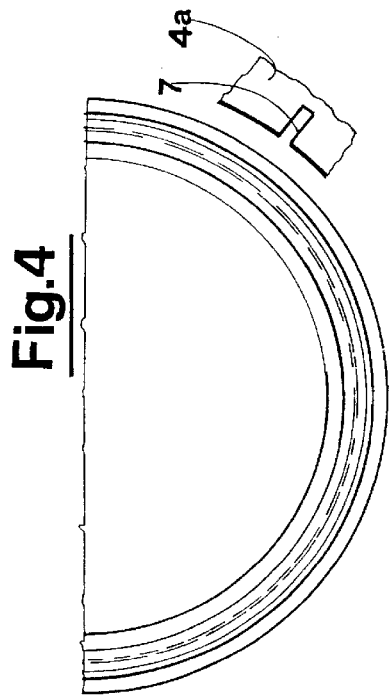
FIG. 4 is a partial schematic view from above of a capsule, with a schematic illustration of a cutting blade.
Figure 3:
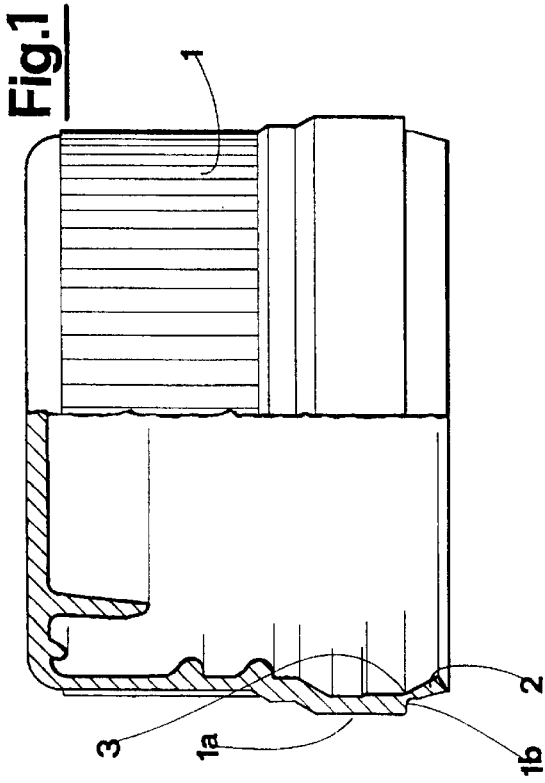
FIG. 3 is a schematic partial vertical-elevation section of a cut capsule, with a schematic illustration of a cutting blade and some cuts.

The process of the invention comprises a pressing phase, in which a plastic material is compressed to obtain a single-piece capsule 1 which is usually screwable on a container, or which might be provided with an internal thread directly during the pressing phase. The capsule 1 is also provided with a skirt 2 connected to the free perimeter 1b of the lower zone 1a of the capsule. The skirt is made directly during the pressing phase. To enable easy extraction of the punch from the die, the skirt is made with a slightly inclined configuration, inclined towards the inside of the capsule, with respect to the lateral wall of the capsule itself. This configuration is illustrated by way of example in FIG. 1.

The capsule thus obtained has a fairly uniform breadth and does not exhibit easy-break zones which, generally, are what lead to setting problems in the dies, constructional complications in the dies themselves, and a high percentage of reject during production.

The skirt is then subjected to a folding phase internalwise of the capsule; this folding phase is preferably obtained by means of inserting, from below and in an axial direction, a calibrated pad (not illustrated) into the capsule. During this phase a plastic deformation is created in the connection zone 3 between the skirt 2 and the lower zone 1a of the capsule, making the deformation permanent, i.e. the folding of the skirt inwards.

Figure 2:
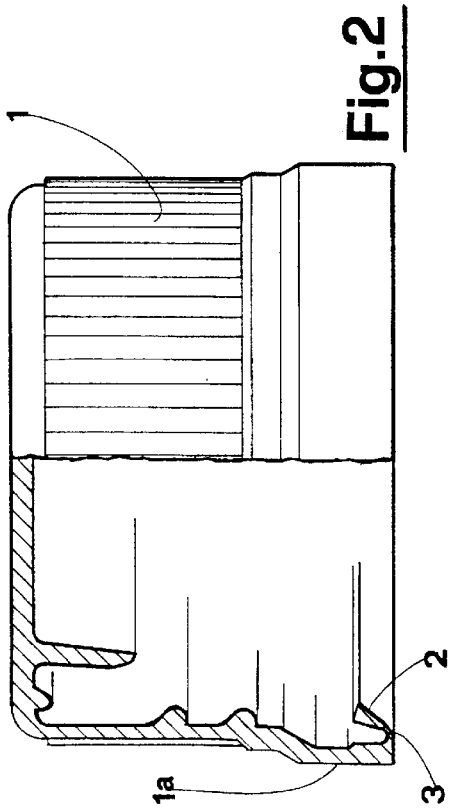
FIG. 2 is a schematic partial vertical-elevation section of a capsule as it appears after he folding phase.

On completion of this phase the capsule exhibits the configuration of FIG. 2. The skirt folded up in this way will perform the function of connecting up with the neck of a container, for example a water bottle—the necks usually having a lip projection under which the skirt will house.

Considerable complications in the die construction can be avoided using this working process. Apart from higher costs, more complicated prior-art dies offer a lower production rate and thus a lower productivity.

A cut is made of the lower zone 1a of the capsule, by radially inserting horizontal blades 4a and vertical blades 4b, both provided with shaped cutting edges; during this phase, cuts 5a and 5b are made in the lower zone, which cuts are of a predetermined shape and size and are generally discontinuous, These cuts constitute the easy-break ruptures, destined to break when the capsule is first opened. After the cutting phase, the parts which have been cut stay connected to the capsule thanks to the discontinuity 8 of the cuts.

Obtaining the discontinuous cuts is an easy process, which consists in shaping the blades by making recesses corresponding to the discontinuity 8 of the cuts. In particular, the vertical blades 4b are provided with shaped cutting edges in such way as to obtain vertical cuts 5b both in the lateral wall of the capsule and in the folded skirt.

Constructively, the operative characteristics indicated for the cutting phase might be obtained, for example, by using a continuous rotary machine having a work station equipped with jaws, not illustrated, for supporting the blades, and which grip each capsule as it arrives while moving in a radial direction with respect to the capsule.

The horizontal cuts 5a might advantageously be alternated with the non-cut zones 6 so that when the capsule is first opened the lower zone of the capsule, which constitutes the security strip, will break at the discontinuities 8 but will stay connected to the remaining part of the capsule in the parts where it is not cut. This is particularly interesting in relation to the problem of recycling of containers.

As the skirt folding and the cutting phases are effected in such a way that the tools that do the folding and cutting do not interfere with each other, the two operations could be done contemporaneously, for example on a single station of a continuous rotary machine, with an obvious increase in process speed. This operating mode is also particularly advantageous in that clean and certainly through-cuts can be made without running the risk of damaging the blades carrying out the cutting operation. The blade, which in order to make clean through-cuts has to cut the external surface of the capsule all the way through, penetrating internally of the capsule, when it has cut through meets either the skirt 2 (i.e. a soft material) where the skirt is higher than the cut made, or an empty zone in cuts where the skirt is lower than the cut. In both cases the blade never come into contact with hard materials such as that used for the pad for folding the skirt or any internal striker surface preventing flexion of the wall of the capsule at the moment of cutting.

These phases can just as easily be carried out in succession, for example using two successive stations of a continuous rotary machine.

The process of the invention does not have the aim of proposing a new type of capsule, but provides a new manufacturing process for capsules, either of known type or new, whose characteristic element is that it uses a succession of working phases, some of which are known in isolation, which enables a series of advantages to be attained: an increase in capsule machine productivity, with a consequent reduction in production costs; a very high working precision, leading to fewer reject pieces; greater facility in inserting the capsule on the container and greater ease of use for the consumer opening the container; elimination of parts the capsule which, on opening, in the known processes remain attached to the container neck, while in the present process remain attached to the container, with consequent reduction of problems connected with container recycling.

What is claimed is:

1. A process for obtaining single-piece capsules made of a plastic material, comprising the following phases:

press-forming of a plastic material to obtain a single-piece capsule (1), of a type which is screwable on to a container, and which is provided with a skirt (2) connected to a free perimeter (1*b*) of a lower zone (1*a*) of a side wall of the capsule;

a folding of the skirt (20 internalwise of the capsule, which folding is achieved by plastic deformation of a connection zone (3) between the skirt (2) and the lower zone of the capsule;

a cutting of the lower zone of the capsule in order to obtain, in said lower zone, cuts (5*b*)

wherein said cuts (5*b*) are vertical cuts both in said side wall and in the folded skirt.

2. The process of claims 1, wherein said folding phase of the skirt (2) is obtained by inserting a calibrated pad into the capsule from below and traveling in an axial direction.

3. The process of claim 2, wherein said skirt folding phase and said cutting phase are carried out contemporaneously.

4. The process of claim 1 wherein said cutting is carried out by a radially-directed insertion of blades, (4*a*, 4*b*) to obtain horizontal cuts (5*a*) along with said vertical cuts (5*b*).

5. The process of claim 4, wherein said cutting phase is performed using horizontal blades (4*a*) and vertical blades (4*b*), which are provided with shaped cutting edges for obtaining discontinuous cuts (5*a*, 5*b*).

6. The process of claim 5, wherein said vertical blades (4*b*) are provided with shaped cutting edges so that said cutting phase of said lower zone of the capsule involves simultaneous cutting of both the side wall of the capsule and the folded skirt.

7. The process of claims 5, wherein the horizontal blades (4*a*) are provided with shaped cutting edges so that the cutting phase provides horizontal cuts (5*a*) which are alternated with uncut zones (6).

8. The process of claim 1, wherein said cutting phase is obtained by a radially-directed insertion of horizontal blades (4*a*) and vertical blades (4*b*), which are provided with shaped cutting edges for obtaining discontinuous cuts (5*a*, 5*b*), said vertical blades (4*b*) being provided with shaped cutting edges so that said cutting phase of said lower zone of the capsule involves both the side wall of the capsule and the folded skirt, the horizontal blades (4*a*) being provided with shaped cutting edges so that the cutting phase provides horizontal cuts (5*a*) which are alternated with uncut zones (6).

9. The process of claim 8, wherein said folding phase of the skirt (2) is obtained by inserting a calibrated pad into the capsule from below and traveling in an axial direction, said skirt folding phase and said cutting phase being carried out contemporaneously.

10. The process of claim 1, wherein said folding phase of the skirt (2) is obtained by inserting a calibrated pad into the capsule from below and traveling in an axial direction, said skirt folding phase and said cutting phase being carried out contemporaneously.

* * * * *